March 2, 1948.  J. D. ROVICK  2,436,902
GEAR GRINDING FIXTURE
Filed Feb. 1, 1945  3 Sheets-Sheet 1

Inventor:
John D. Rovick
By Edward C. Fitzbaugh
Atty.

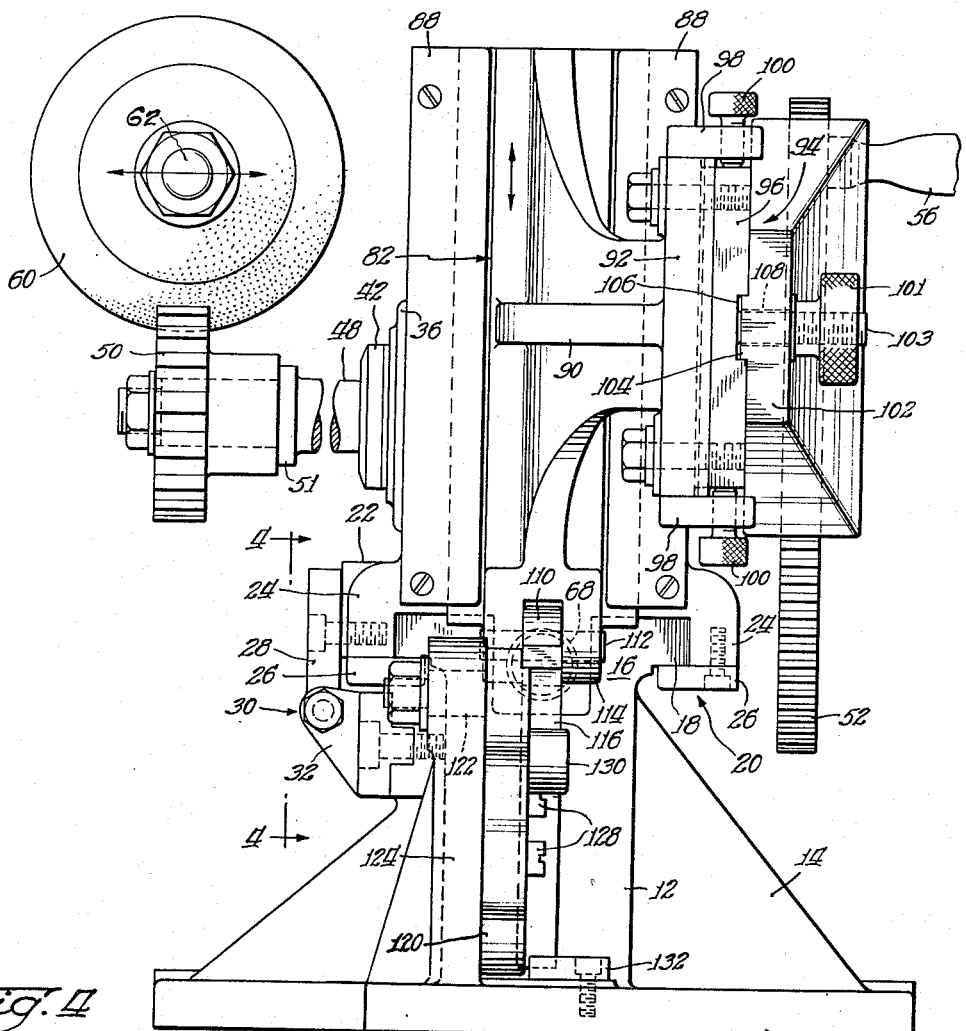

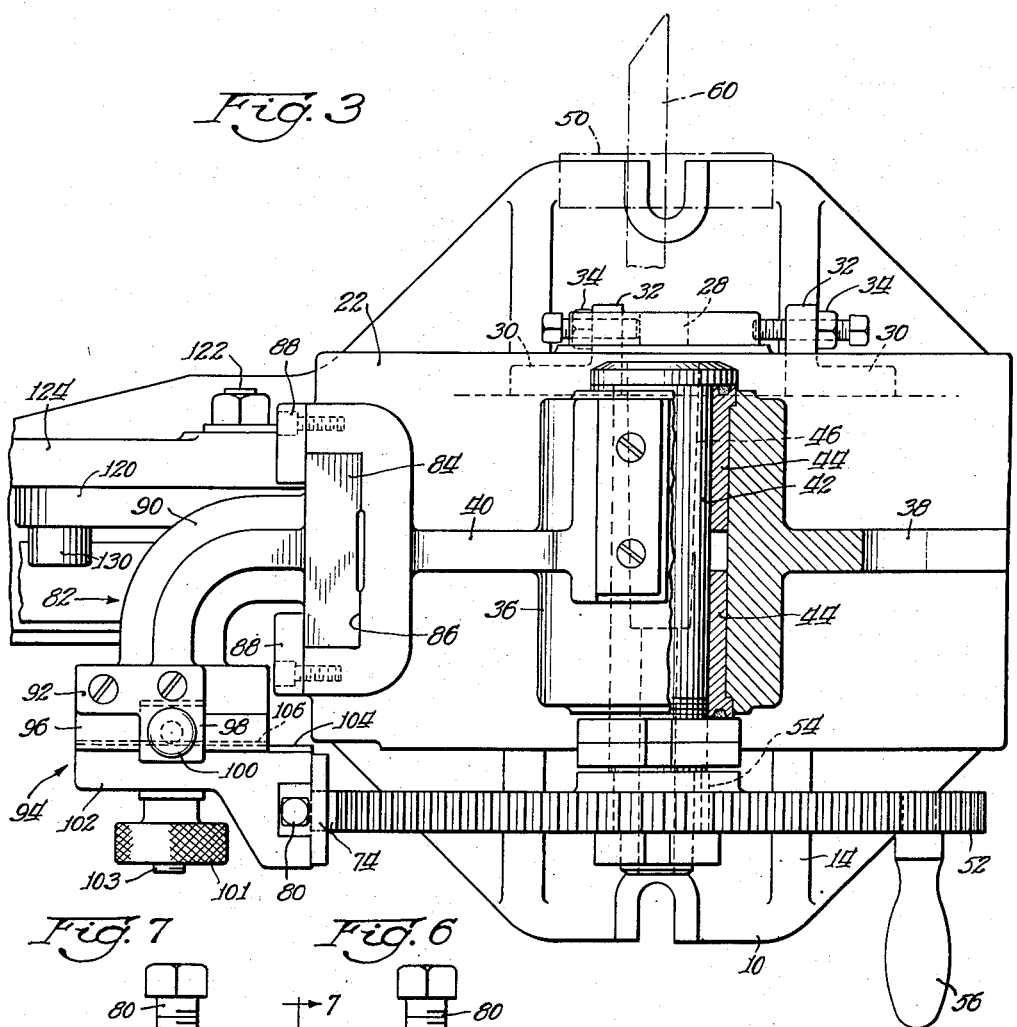
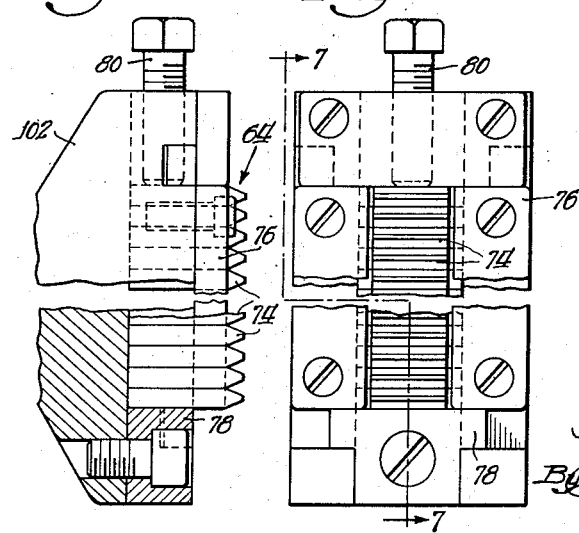

Patented Mar. 2, 1948

2,436,902

UNITED STATES PATENT OFFICE 2,436,902

GEAR GRINDING FIXTURE

John D. Rovick, Muncie, Ind., assignor to Borg-Warner Corporation, Chicago, Ill., a corporation of Illinois Application February 1, 1945, Serial No. 575,640

17 Claims. (Cl. 51—123)

The present invention relates generally to the art of gear grinding. More specifically the improvements are directed to a gear grinding fixture that may be readily attached to a conventional grinding machine and is adapted for co-operation therewith to quickly produce small quantities of gears at relatively low manufacturing cost.

When small quantities of gears are desired, as for example when constructing experimental machines, the cost of securing such gears is usually high. This is due to the fact that before such gears can be produced on a standard gear grinding machine certain individual parts must be obtained preparatory to starting the grinding operations. These individual parts frequently are expensive because they usually must be specially made, and also considerable time is lost in securing them which delays completion of the experimental machine. By using the gear grinding fixture of the present invention the desired gears may be obtained cheaply and with considerable speed. Thus the time required to build an experimental assembly and the cost thereof will be materially reduced.

In the present fixture, a reciprocable carrier journals a spindle or arbor upon which the work gear and a large indexing or driving gear are secured. Also on the carrier there is a rack that is reciprocated by the indexing gear for engagement with a stationary cam device or sine bar to effect the reciprocatory movement of the carrier while the work gear is operated on by a rotating grinding wheel that is preferably on an axis fixed with respect to the carrier. By reason of this arrangement there is imparted to the work gear both a rotary and a transverse movement so that at least a side or face of a tooth is formed by the driving wheel.

The arrangement above described contemplates the use of indexing gears having a plurality of accurately made teeth which are multiples of the work gear teeth, and the grinding of a work gear tooth is accomplished by imparting to the indexing or driving gear a back and forth rocking motion through a relatively slight angle thereby to effect a corresponding rotary reciprocable movement to the work gear while engaged with the tooth forming member.

It is one of the principal objects of this invention to simplify the construction and arrangement of a gear grinding fixture such as contemplated herein, and to improve the efficiency, operation and dependability of such fixture.

Another principal object of this invention is to provide a gear finishing fixture that is adapted to efficiently produce gears in small quantities at relatively low cost and within a minimum of time.

Still another object hereof is to provide a gear finishing fixture that is comparatively simple in the operation, construction and arrangement of its parts, and is adapted to be readily assembled or set up on a standard grinding machine.

Additional objects, aims and advantages of the invention contemplated herein will be apparent to persons skilled in the art after the construction and operation of the gear finishing fixture is understood from the within description. It is preferred to accomplish the numerous objects hereof and to practice the invention in substantially the manner hereinafter fully described and as particularly pointed out in the appended claims. Reference is now made to the accompanying drawings that form a part of this specification, wherein:

Fig. 2 is a vertical side elevation of the arrangement shown in Fig. 1 looking at the left side thereof;

Fig. 3 is a top plan of the arrangement shown in Figs. 1 and 2;

Fig. 4 is a fragmentary elevation along the plane of line 4—4 on Fig. 2;

Fig. 6 is a vertical face elevation of the rack member used in the gear grinding fixture; and Fig. 7 is a vertical side elevation of the rack partly in section along the plane of line 7—7 on Fig. 6.

The drawings are to be understood as being more or less schematic for the purpose of disclosing a typical or preferred form of the improvements contemplated herein. In these drawings like reference characters identify the same parts in the different views.

Figure 1:
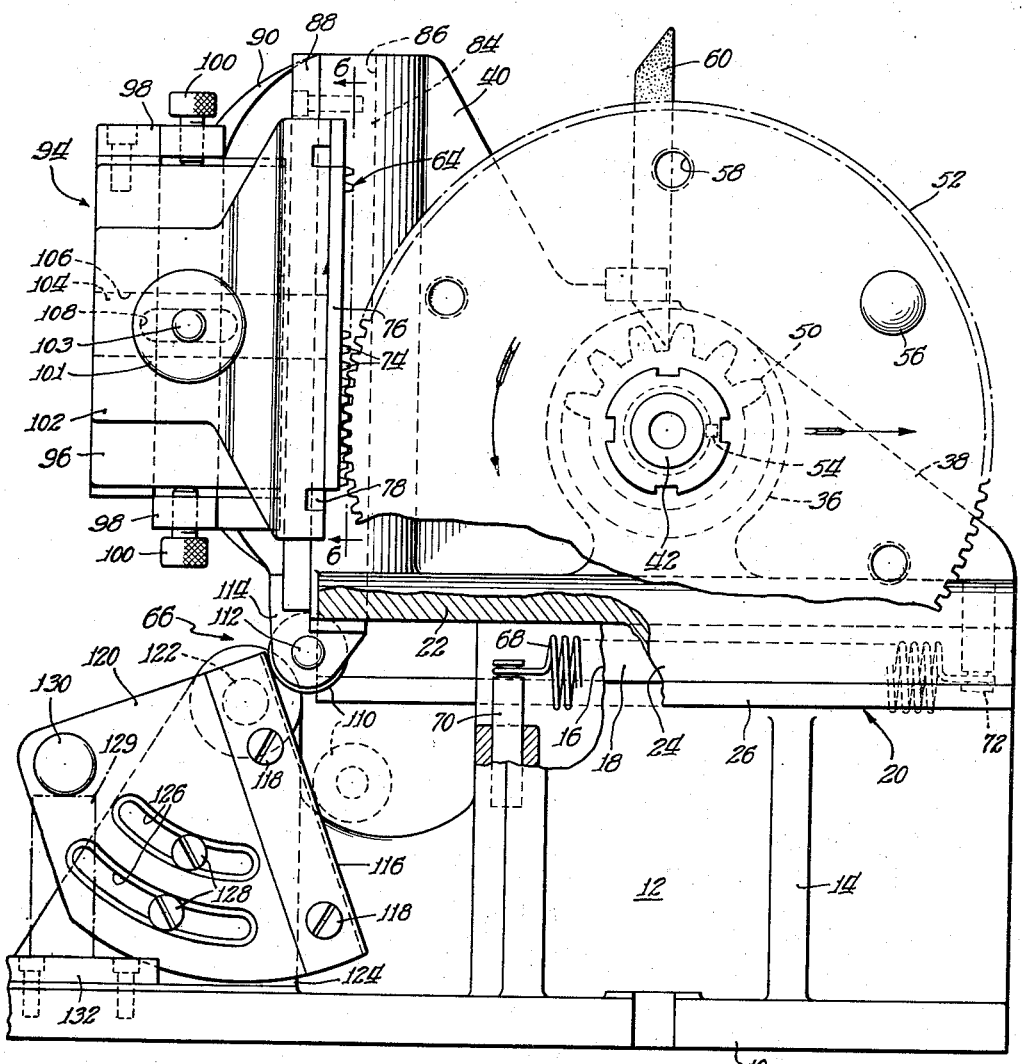
Fig. 1 is a vertical front elevation of a gear grinding fixture embodying the present invention.
Figure 5:
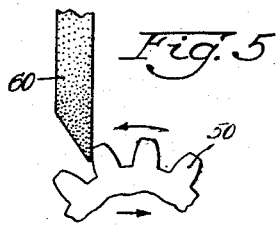
Fig. 5 is a diagrammatic view showing the relative position of a gear tooth at the completion of a grinding operation on a face thereof.

The fixture contemplated herein comprises a base 10 having a transverse vertical wall 12 arising therefrom that is braced by webs 14, and there is a bed 16 on the upper margin of the wall 12 having overhanging portions 18 that provide longitudinal parallel guides for a slide assembly 20. The slide assembly comprises the substantially rectangular slide 22 having downwardly extending flanged sides 24 that engage the longitudinal edges of the bed 16 upon which the slide is reciprocated in a longitudinal direction. The lower faces of the flanges 24 have elongated retainer plates 26 secured to them that project laterally inward to underlie the edges of the bed 16 to maintain the slide assembly on the bed. The longitudinal movement of the slide 22 is limited by means of a lug 28 depending from a margin of the slide between stops 30 that are spaced apart for predetermining the distance to be traveled by the slide. These stops 30 comprise threaded bolts screwed into lugs 32 on the bed 16 and secured in adjusted positions by lock nuts 34, as detailed in Fig. 4.

A large horizontally disposed bearing boss 36 is formed on the slide and is reinforced by upright webs or walls 38 and 40. This bearing boss 36 receives a rotatable spindle 42 that is journaled in bushings 44 in the bore of the boss and extends beyond both ends of the boss as seen in Fig. 3. This spindle has a tapered socket 46 into which the arbor 48 is inserted for carrying the work gear 50 in a suitable chuck or other device at the end thereof. The spindle 42 together with the arbor 48 and the work gear 50 are adapted to be rotated by means of a large driving gear 52 splined at 54 upon the end of the spindle 42 opposite the arbor 48. This large gear is adapted to be rotated by means of a handle 56 which may be inserted into any one of a plurality of threaded holes 58 made transversely through the body of the driving gear 52. The teeth on the large driving gear 52 are multiples of the teeth on the work gear 50 and are of a fine pitch.

The grinding wheel 60, which is preferably of the beveled or chamfered edge type, is secured to a spindle 62 to be rotated while engaged with the face of the work gear 50. The grinding wheel 60 also is moved bodily by suitable mechanism (not shown) in a direction longitudinally of the face of the tooth on which it is operating. Initially the grinder is engaged with the face of the tooth at the root thereof and when the large grinding gear 52 is rotated counterclockwise as indicated Fig. 1 the grinding wheel is adapted to be engaged progressively with the face of the tooth until the tip of the tooth has been ground. In order to do this the slide 22 is moved longitudinally on the bed 18 by means of suitable devices that are actuated by the driving gear 52.

The devices for moving the slide comprise a reciprocable rack 64 arranged preferably tangent to the driving gear 52 and in mesh therewith so that when the gear 52 is moved in rotary reciprocable manner the rack 64 will be correspondingly reciprocated for operating a cam assembly 66 that is adapted to reciprocate the slide 22. In order to assist in returning the slide 22 to a position where the wheel 60 begins its grinding operation there is a coil spring 68 one end of which is secured to a post 70 on the bed 16 or other stationary portion of the fixture, and the other end of which is secured to a post 72 on the under portion of the slide 22. The rack, as shown in detail in Figs. 6 and 7 comprises a plurality of teeth in the form of separate blocks 74 arranged side-by-side in a frame of chase-like form. The chase frame assembly 76 is rectangular and has an abutment 78 adjacent one end against which the tooth blocks 74 are clamped by a bolt 80 screwed into the other end of the chase against the adjacent tooth block thus effecting a unitary assembly.

As seen in Fig. 3 the rack unit 64 is mounted in a vertically movable slide assembly 82 comprising an elongated vertically arranged plate or slide member 84 movable vertically in a channeled guide 86 that is preferably formed integrally with the reinforcing or strengthening web 40 of the main slide 22. The slide plate 84 is retained in the guide 86 by parallel metal strips 88 secured to and overlying the margins of guide 86 for engagement with the outer face of the slide plate 84 as shown in Fig. 3. An arcuate arm 90 extends away from the slide plate 84 and terminates in a vertical wall 92 that is preferably in a plane with its face at a right angle to the plane of the face of the slide plate 84.

The wall 92 provides a mounting for a carrier member 94 in which the rack assembly 64 is secured. The carrier 94 is a two-part arrangement one of the members 96 of which is mounted between upper and lower lateral arms 98, 98 that project away from the vertical plate 92 above and below the member 96. Lock bolts 100, screwed through arms 98 engage the upper and lower ends of the member 96 to hold it in position. The other member 102 of this assembly has a longitudinal rib 104 on its rear face that is guided in a shallow channel 106 in the adjacent face of the fixed member 96 to permit horizontal movement of the member 102. The rack assembly 64 is mounted on the vertical side of the member 102 and this member 102 is locked in place by means of a knurled hand nut 101 that is screwed on a threaded stud 103 projecting from the fixed member 96 of the rack carrier. As seen in Fig. 1, this member 102 has an elongated slot 108 through which the threaded stud 103 passes to permit the rack-carrying plate to be adjusted. When it is desired to disengage the rack 64 from the driving gear 52, to index the work gear for another tooth, the hand nut 101 is loosened so that the movable member 102 of the carrier assembly may be moved in a direction to disengage the teeth of the rack assembly 64 from the driving gear 52. This permits the driving gear to be rotated to index the work gear to a position where another tooth on the work gear may be operated upon by the grinder wheel 60.

Means are provided for moving the main slide 22 to shift the spindle 42 and the work gear in a direction transverse to the axis of the spindle. The aforesaid means comprise roller 110 carried on pin 112 between spaced ears 114 at the lower portion of the carrier assembly, preferably on the lower end of the plate 92 thereof. Roller 110 rides on the cam device 116 that is mounted in a position that is preferably oblique to the vertical plane of the rack as shown in Fig. 1. This cam face 116 is detachably mounted, by means of screws 118, on a face of an irregularly shaped rocker or segment plate 120, that is arranged for swinging movement on a pivot 122 projecting laterally from an upstanding mounting plate 124 on the base 10. The segment plate 120 has a plurality of arcuate slots 126 that are coaxial with the center of the pivot 122 on which the segment plate swings. The means for locking the plates comprise bolts 128 that pass through the slots 126 and screw into the upstanding supporting plate 124. In order to set the position of the face cam 116 to the proper angle the segment plate 120 has a button 130 for engagement with a block gauge 129 that may be inserted between it and a foot 132 on the base 10. It will be understood that the face cam 116 while shown as comprising a straight face arranged oblique to the vertical movement of the rack assembly, this cam face may be a concave, convex, or an ogee compound curve, depending upon the type of face to be ground upon a gear tooth. The arrangement shown is adapted for grinding a tooth the face of which describes an involute curve.

From the foregoing it will be understood that the work gear is securely mounted on the shaft or spindle 42 of the large gear that is rotatably journaled on the shiftable slide 22 supporting the assembly which includes the rack and its guide or carrier members. Preferably, the large gear 52 is manually rocked back and forth in a rotary reciprocatory manner through a relatively slight angle. The rack assembly 64, by reason of its engagement with the stationary face cam 116 will reciprocate the main slide 22 transverse to the axis of the spindle 42. Thus there is imparted to the work gear, both a rotary and a transverse movement while the work gear tooth face is engaged with the grinding wheel 60 so that one side or face of the tooth will be formed by such dual movement. The rack assembly 64 is arranged to be retracted from the large driving gear 52 for indexing the work gear, and while the rack is in retracted position the large gear is advanced a sufficient number of teeth to properly position another work gear tooth for engagement with the grinding wheel. The teeth 74 of the rack are individually ground to proper proportions and contour and provision is made for adjusting the rack to properly position it with respect to the driving gear 52. It is contemplated that a number of these large gears will be kept on hand for grinding work gears having various numbers of work gear teeth and that the teeth of these large gears will be accurately formed by hobbing operations. Also a number of face cams may be kept on hand, having differently shaped faces for the purpose of producing work gear teeth that may require special or unusual cross-sectional contour. After the faces on one side of the teeth have been formed on the work gear 50, said work gear is removed and reversely mounted on its arbor. Alternatively, the grinding wheel may be reversed for grinding the other faces of the work gear teeth.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A gear grinding fixture comprising a base; and an assembly thereon including two slides arranged for reciprocable movement in planes transverse to each other, the first slide movable on said base, the first slide supporting the second slide for movement with respect thereto; a spindle rotatably mounted on the first slide, said spindle supporting the work gear; a driving gear on said spindle adapted to impart rotary reciprocatory movement to the work gear; a rack on the second slide engaged with said driving gear adapted to impart reciprocatory movement to the second slide; and a cam on said base adapted for engagement with said second slide during its reciprocatory movement thereby to effect the reciprocatory movement of the first slide, said assembly constructed and arranged so that the work gear is rotated and bodily moved transverse to its axis during engagement with a grinding gear.

2. A gear grinding fixture comprising a base; and an assembly thereon including two slides arranged for reciprocable movement in planes transverse to each other, the first slide reciprocably mounted on said base and supporting the second slide; driving means on the first slide comprising a driving gear and spindle supporting and imparting rotative movement to a work gear; means on the second slide effecting reciprocable movement thereof, said means including a rack meshed with said driving gear, and a roller; and a cam on said base engaged by said roller during reciprocatory movement of said second slide whereby the movement of said first slide is effected, said assembly being constructed and arranged so that the work gear on said spindle is rotated and moved bodily transverse to its axis during engagement with a grinding wheel.

3. A gear grinding fixture comprising a base; and an assembly thereon including a horizontal and a vertical slide, the horizontal slide movable on said base, said horizontal slide supporting the vertical slide for movement therewith and also independently thereof; a rotary reciprocable horizontal spindle journaled on said horizontal slide, the work gear being secured to said spindle for engagement with a grinder; a rack secured to said horizontal slide; a driving gear secured to said spindle and in mesh with said rack adapted to impart reciprocable movement to said vertical slide transverse to the axis of said spindle; a cam member supported on said base in the line of travel of said vertical slide; and means on the vertical slide adapted to engage said cam member during movement of said vertical slide to impart reciprocable movement to said horizontal slide, whereby the rotation of said spindle and the combined movements of said slides are adapted to rotate the work gear and bodily move it transverse to the grinder to produce an involute tooth face.

4. A gear grinding fixture as defined in claim 3 wherein the cam member is adjustable with respect to the vertical slide for inscribing a variety of tooth faces on different work gears.

5. A gear grinding fixture comprising a rotatable spindle for supporting the work gear; a grinding wheel adapted for engagement with a face of a work gear tooth; a driving gear on said spindle; a sliding rack reciprocated by said driving gear; means supporting said spindle and rack for reciprocable movement transverse to the axis of said spindle whereby said rack is shifted bodily in a direction transverse to its sliding movement; and means actuated by the sliding movement of said rack for effecting the aforesaid transverse movement of said supporting means, the arrangement being effective to rotate the work gear and move it transverse to its axis while engaged with said grinding wheel.

6. A gear grinding fixture as defined in claim 5 wherein the means actuated by the rack for effecting transverse movement of the supporting means comprises a cam device mounted independent of a supporting means.

7. A gear grinding fixture as defined in claim 5 wherein the means for effecting transverse movement of the supporting means comprises a cam device adjustably arranged with respect to the rack for predetermining the pattern inscribed by the grinding wheel on the work gear.

8. A gear grinding fixture comprising a rotatable spindle for supporting the work gear; a grinding wheel adapted for engagement with a face of a work gear tooth; a driving gear on said spindle; a rack reciprocated by said driving gear; a support adapting said spindle and rack for reciprocable movement transverse to the axis of said spindle; a cam engaged by said rack for effecting the aforesaid transverse movement of said support; the arrangement being effective to rotate the work gear and move it transverse to its axis while engaged with said grinding wheel; and means independent of said support for mounting said cam for adjustment relative to said rack thereby to vary the movement of said support.

9. A gear grinding assembly comprising a grinding wheel adapted for engagement with a face of a work gear tooth; a driving gear imparting rotary reciprocatory movement to the work gear; slideable means supporting said driving gear and the work gear for reciprocable bodily movement transverse to the rotational axis thereof; and means for effecting the aforesaid reciprocable bodily movement comprising a member carried by said slideable supporting means and actuated by said driving gear to move in a plane intersecting the plane of bodily movement of said driving gear; a cam bar engaged by said member, said cam bar being fixed with relation to said slideable supporting means; and means for adjustably positioning said cam bar with respect to said member whereby to predetermine and vary the movement of said slidable supporting means, the assembly being constructed and arranged so as to produce an involute face on a work gear tooth.

10. A gear grinding assembly comprising a rotatable grinding wheel; a driving gear for imparting rotative movement to a work gear engaged by said wheel; a reciprocable support for the work gear and driving gear; a reciprocable rack on said support meshed with said driving gear and movable in a plane intersecting the plane of movement of said support; and means coacting with said rack for effecting said reciprocal movement of said support, the assembly being constructed and arranged to engage a face of a work gear tooth progressively with said grinding wheel for describing an involute.

11. A gear grinding assembly comprising a rotatable grinding wheel; a driving gear for rotating the work gear; a base; a reciprocal slide on said base supporting the work gear and driving gear; a reciprocable rack on said slide in mesh with said driving gear and movable in a plane intersecting the plane of movement of said slide; and means on said base coacting with said rack for effecting said reciprocal movement of said slide whereby to bodily move the work gear transverse to its rotational axis, the assembly being constructed and arranged to engage a face of a work gear tooth progressively with said grinding wheel for describing an involute.

12. A gear grinding arrangement comprising a rotatable grinding wheel; supporting means for holding a work gear engaged with said wheel; means for imparting a combined rotative and bodily transverse movement of said work gear supporting means during engagement of a tooth face of the work gear with said grinding wheel, said means including a driving gear and a rack meshed therewith; and means for indexing the work gear supporting means comprising a shiftable carrier for said rack adapted to disengage the rack from said driving gear for permitting free rotation of said driving gear to position another tooth of the work gear for engagement with said grinding wheel, said free rotation of the driving gear being ineffective with respect to the bodily transverse movement of said work gear supporting means.

13. A gear grinding arrangement comprising a base; a slide reciprocable on said base; a rack on said slide adapted for movement transverse to said slide; a work gear spindle mounted for rotation on said slide; a driving gear secured to said spindle in mesh with said rack; a cam on said base engaged with said rack for effecting movement of said slide; the arrangement being adapted to impart a combined rotary and transverse bodily movement to the work gear supporting means; and a rotatable grinding wheel positioned to engage a face of a work gear tooth during said combined rotary and transverse bodily movement of said work gear supporting means.

14. A gear grinding arrangement comprising a rotatable grinding wheel; sliding means supporting a work gear for engagement by said wheel; devices for imparting rotative and transverse movement to said work gear supporting means during engagement of a work gear tooth face with said grinding wheel, said devices including a rack slidable transverse to said supporting means; cam means actuated by said rack and effective to inscribe the desired face on a work gear tooth; and indexing means effective to engage another tooth face with said grinding wheel.

15. A gear grinding arrangement as defined in claim 14 wherein the cam means is adjustable whereby a variety of tooth faces is inscribed by the wheel upon different work gears.

16. A gear grinding arrangement as defined in claim 14 wherein stops are provided for limiting the transverse movement of the work gear.

17. In combination with a rotatable grinding wheel; a gear grinding fixture comprising a base; and an assembly on said base comprised of two slides arranged for reciprocable movement in planes transverse to each other, the first slide being adapted for horizontal sliding movement on said base, the second slide being supported on the first slide for movement therewith and being adapted for vertical reciprocable movement independent of said first slide; rotatable driving means including a spindle carried by said first slide, said spindle being adapted to support a work gear and impart rotative movement thereto during engagement of a work gear tooth face with said grinding wheel; means on the second slide engaged with said rotatable driving means for effecting the aforesaid vertical reciprocable movement of said second slide; cam means interposed between said base and second slide and being effective during reciprocatory movement of the second slide to impart the aforesaid horizontal reciprocatory movement of the first slide, said assembly being so constructed and arranged that the work gear, during engagement with said grinding wheel, is rotated by said driving means and said work gear is also bodily moved transverse to its rotational axis by said second slide thereby to form a work face on a gear tooth; and indexing means effective to engage another tooth face of the work gear with said grinding wheel.

JOHN D. ROVICK.

REFERENCES CITED

The following references are of record in the file of this patent:

UNITED STATES PATENTS

| Number | Name | Date |
|---|---|---|
| 1,462,985 | Schurr | July 24, 1923 |
| 2,161,897 | Klomp | June 13, 1939 |
| 2,257,850 | Miller | Oct. 7, 1941 |
| 2,360,235 | Jellis | Oct. 10, 1944 |
| 2,366,993 | Antos | Jan. 9, 1945 |